(12) United States Patent
Schlegel

(10) Patent No.: US 7,651,973 B2
(45) Date of Patent: *Jan. 26, 2010

(54) CONTACT AND ADSORBENT GRANULES

(75) Inventor: Andreas Schlegel, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/217,971

(22) Filed: Jul. 10, 2008

(65) Prior Publication Data

US 2008/0274043 A1   Nov. 6, 2008

Related U.S. Application Data

(62) Division of application No. 09/962,935, filed on Sep. 25, 2001, now abandoned.

(30) Foreign Application Priority Data

| Sep. 26, 2000 | (DE) | ................... | 10047997 |
| Mar. 29, 2001 | (DE) | ................... | 10115415 |
| Jun. 18, 2001 | (DE) | ................... | 10129304 |

(51) Int. Cl.
*B01J 23/70* (2006.01)
*B01J 23/74* (2006.01)

(52) U.S. Cl. ..................... 502/338; 502/336

(58) Field of Classification Search ............... 502/336, 502/338
See application file for complete search history.

(56) References Cited

U.S. PATENT DOCUMENTS

| 3,926,659 | A | * | 12/1975 | Bernhard et al. ............. 106/418 |
| 4,459,370 | A |   | 7/1984  | van der Wal et al. ......... 502/338 |
| 4,481,087 | A |   | 11/1984 | DiGiacomo ................... 204/95 |
| 4,497,723 | A | * | 2/1985  | Ohlinger et al. .......... 252/62.56 |
| 4,514,216 | A | * | 4/1985  | Mishima et al. ............. 420/112 |
| 4,515,756 | A |   | 5/1985  | Blumer ........................ 423/54 |
| 4,587,228 | A | * | 5/1986  | Frank et al. .................. 502/185 |
| 5,502,021 | A |   | 3/1996  | Schuster ...................... 502/400 |
| 5,609,789 | A | * | 3/1997  | Asano et al. ............. 252/62.56 |
| 5,948,726 | A |   | 9/1999  | Moskovitz et al. .......... 502/415 |
| 6,024,890 | A | * | 2/2000  | Poganiuch et al. ........ 252/62.58 |
| 6,228,160 | B1 | * | 5/2001 | Hanich et al. ............... 106/456 |
| 6,551,958 | B1 | * | 4/2003 | Baier et al. .................. 502/304 |
| 7,267,776 | B2 | * | 9/2007 | Wurth et al. ................. 210/688 |
| 7,407,588 | B2 | * | 8/2008 | Schlegel ...................... 210/688 |
| 2003/0209495 | A1 | * | 11/2003 | Schlegel ................... 210/660 |
| 2008/0271600 | A1 | * | 11/2008 | Schlegel et al. ............... 95/90 |
| 2008/0271601 | A1 | * | 11/2008 | Schlegel et al. ............... 95/90 |
| 2008/0272054 | A1 | * | 11/2008 | Schlegel et al. ............. 210/661 |

FOREIGN PATENT DOCUMENTS

| DE | 31 20 891 | 12/1982 |
| DE | 38 00 873 | 7/1988 |
| DE | 42 14 487 | 11/1993 |
| DE | 43 20 003 | 12/1994 |
| DE | 198 26 186 | 12/1999 |
| JP | 55-132633 | 10/1980 |
| WO | 83/03595 | 10/1983 |
| WO | 99/50182 | 10/1999 |

OTHER PUBLICATIONS

Patent Abstract of Japan, vol. 1996, No. 07, Jul. 31, 1996 & JP 08 059244 A (Toda Kogyo Corp), Mar. 5, 1996 Zusammenfassung.

* cited by examiner

*Primary Examiner*—Cam N Nguyen
(74) *Attorney, Agent, or Firm*—Nicanor A. Kohncke

(57) ABSTRACT

The present invention relates to a filtering unit at least partially filled with particles agglomerated from fine-particle iron oxide and/or iron oxyhydroxide by producing an aqueous suspension of fine-particle iron oxides and/or iron oxyhydroxides having a BET surface area of 50 to 500 $m^2/g$, and removing the water and dissolved constituents by a set of washing drying and filtering steps and processes of using the particles.

6 Claims, No Drawings

CONTACT AND ADSORBENT GRANULES

This application is a divisional of U.S. patent application Ser. No. 09/962,935, filed on Sep. 25, 2001, now abandoned, entitled CONTACT AND ADSORBENT GRANULES, the contents of which are hereby incorporated by reference in their entirety.

BACKGROUND OF THE INVENTION

The present invention relates to particles, pellets or granules of fine-particle or nanoparticle iron oxides and/or iron oxyhydroxides having a large specific surface area (50 to 500 $m^2/g$ according to BET), and processes for their production. These pellets have high mechanical resistance and can be used as a contact, adsorbent, or catalyst for the catalysis of chemical reactions, for the treatment of fluid media like liquids and/or for gas, specifically the removal of impurities.

Contact and adsorbent granules, including those based on iron oxides and/or iron oxyhydroxides, have already been described. They are predominantly used in continuous processes. They are conventionally found in tower or column-type units through which the medium to be treated flows, and the chemical or physical reaction or adsorption processes take place at the outer and inner surface of the granules. Powdered materials cannot be used for this purpose because they compact in the direction of flow of the medium, thereby increasing the flow resistance until the unit becomes blocked. If a unit is cleaned by back-flushing (see below), large amounts of the powder are discharged and lost or cause an unacceptable contamination of the waste water.

The flowing media also exert forces on the granules, however, which can lead to abrasion and/or movement through to violent agitation of the granules. Consequently the granules collide, leading to undesirable abrasion. This results in loss of contact or adsorbent material and contamination of the medium to be treated.

Adsorbents/catalysts containing iron oxides and hydroxides can advantageously be used e.g. in the area of water purification or gas purification. In water purification this agent is used in horizontal- or vertical-flow filters or adsorber columns or added to the water to be treated in order to remove dissolved, suspended or emulsified organic or inorganic phosphorus, arsenic, antimony, sulfur, selenium, tellurium, beryllium, cyano and heavy metal compounds from, for example, drinking water, process water, industrial and municipal waste water, mineral, holy and medicinal water as well as garden pond and agricultural water. It can also be used in so-called reactive walls to separate the cited contaminants from ground water and seepage water aquifers from contaminated sites (waste disposal sites).

In gas purification the agent is used in adsorbers for binding undesirable components such as hydrogen sulfide, mercaptans and hydrogen cyanide, as well as other phosphorus, arsenic, antimony, sulfur, selenium, tellurium, cyano and heavy metal compounds in waste gases. Gases such as HF, HCl, $H_2S$, $SO_x$, $NO_x$ can also be adsorbed.

The removal of phosphorus, arsenic, antimony, selenium, tellurium, cyano and heavy metal compounds from waste oils and other contaminated organic solvents is also possible.

Contact and adsorbent granules based on iron oxides and/or iron oxyhydroxides are also used for the catalysis of chemical reactions in the gas phase or in the liquid phase.

Various methods of removing trace constituents and contaminants from aqueous systems with the aid of adsorbents are also known.

For example, DE-A 3 120 891 describes a process in which a filtration is performed using activated alumina with a grain size of 1 to 3 mm for the separation principally of phosphates from surface water.

DE-A 3 800 873 describes an adsorbent based on porous materials such as e.g. hydrophobed chalk with a fine to medium grain size to remove contaminants from water.

DE-A 3 703 169 discloses a process for the production of a granulated filter medium to treat natural water. The adsorbent is produced by granulating an aqueous suspension of kaolin with addition of powdered dolomite in a fluidised bed. The granules are then baked at 900 to 950° C.

A process for the production and use of highly reactive reagents for waste gas and waste water purification is known from DE-A 40 34 417. Mixtures consisting of $Ca(OH)_2$ with additions of clays, stone dust, entrained dust and fly ashes, made porous and having a surface area of approx. 200 $m^2/g$, are described here.

The cited processes have the disadvantage that the component responsible in each case for the selective adsorption of constituents of the media to be cleaned, in other words the actual adsorbent, must be supplemented with large quantities of additives to enable it to be shaped into granules. This significantly reduces the binding capacity for the water contaminants to be removed. Moreover, subsequent reprocessing or reuse of the material is problematic since the binder substances first have to be separated out.

DE-A 4 214 487 describes a process and a reactor for the removal of impurities from water. The medium flows horizontally through a funnel-shaped reactor, in which finely divided iron hydroxide in flocculent form is used as a sorption agent for water impurities. The disadvantage of this process lies in the use of the iron hydroxide in flocculent form, which means that because there is little difference in density between water and iron hydroxide, a reactor of this type can be operated at only very low flow rates and there is a risk of the sorption agent, which is possibly already loaded with contaminants, being discharged from the reactor along with the water.

JP-A 55 132 633 describes granulated red mud, a by-product of aluminium production, as an adsorbent for arsenic. This consists of $Fe_2O_3$, $Al_2O_3$ and $SiO_2$. No mention is made of the stability of the granules or of the granulation process. A further disadvantage of this adsorbent is the lack of consistency in the composition of the product, its unreliable availability and the possible contamination of the drinking water with aluminium. Since aluminium is suspected of encouraging the development of Alzheimer's Disease, contamination with this substance in particular is to be avoided.

DE-A 19 826 186 describes a process for the production of an adsorbent containing iron hydroxide. An aqueous polymer dispersion is incorporated into iron hydroxide in water-dispersible form. This mixture is then either dried until it reaches a solid state and the solid material then comminuted mechanically to the desired shape and/or size or the mixture is shaped, optionally after a preliminary drying stage, and a final drying stage then performed, during which a solid state is achieved. In this way a material is obtained in which the iron hydroxide is firmly embedded in the polymer and which is said to display a high binding capacity for the contaminants conventionally contained in waste waters or waste gases.

The disadvantage of this process lies in the use of organic binders, which further contaminate the water to be treated due to leaching and/or abrasion of organic substances. Furthermore, the stability of the adsorbent composite is not guaranteed in extended use. Bacteria and other microorganisms can also serve as a nutrient medium for an organic binder, presenting a risk that microorganisms may populate the contact and thereby contaminate the medium.

The presence of foreign auxiliary substances, which are required for the manufacture of the adsorbents, during reprocessing, recycling or reuse of used adsorbents is disadvantageous in principle because the reuse of pure substances is less problematic than is the case with mixed substances. For example, polymeric binders are disadvantageous when iron oxide-based adsorption materials are reused as pigments for concrete coloration because these binders inhibit dispersion of the pigment in liquid concrete.

DE-A 4 320 003 describes a process for the removal of dissolved arsenic from ground water with the aid of colloidal or granulated iron hydroxide. Where fine, suspended iron(III) hydroxide products are used, it is recommended here that the iron hydroxide suspension be placed in fixed-bed filters filled with granular material or other supports having a high external or internal porosity. This process likewise has the disadvantage that, relative to the adsorbent "substrate+iron hydroxide", only low specific loading capacities are achievable. Furthermore, there is only a weak bond between substrate and iron hydroxide, which means that there is a risk of iron hydroxide or iron arsenate being discharged during subsequent treatment with arsenic-containing water. This publication also cites the use of granulated iron hydroxide as an adsorption material for a fixed-bed reactor. The granulated iron hydroxide is produced by freeze conditioning (freeze drying) of iron hydroxide obtained by neutralisation of acid iron(III) salt solutions at temperatures of below minus 5° C. This production process is extremely energy-intensive and leads to heavily salt-contaminated waste waters. Moreover, as a result of this production process only very small granules with low mechanical resistance are obtained. When used in a fixed-bed reactor, this means that the size spectrum is significantly reduced by mechanical abrasion of the particles during operation, which in turn results in finely dispersed particles of contaminated or uncontaminated adsorption agent being discharged from the reactor. A further disadvantage of these granules lies in the fact that the adsorption capacity in respect of arsenic compounds is reduced considerably if the granules lose water, by being stored dry for extended periods for example.

Adsorbent/binder systems obtained by removing a sufficiently large amount of water from a mixture of (a) a crosslinkable binder consisting of colloidal metal or non-metal oxides, (b) oxidic adsorbents such as metal oxides and (c) an acid such that components (a) and (b) crosslink to form an adsorbent/binder system, are known from U.S. Pat. No. 5,948,726. According to the disclosure, colloidal alumina or aluminium oxide is used as binder.

The disadvantage of these compositions lies in the need to use acid in their production (column 9, line 4) and in the fact that they are not pure but heterogeneous substances, which is undesirable both for the production, regeneration, removal and permanent disposal of such adsorbents, e.g. on a waste disposal site. The scope of disclosure of this publication is also intended to include adsorbents that are suitable for the adsorption of arsenic; specific examples are not provided, however. Aluminium oxide is known to be significantly inferior to iron oxides in regard to force of adsorption for arsenic.

Continuous adsorbers, which are commonly grouped together in parallel for operation, are preferably used for water treatment. To free drinking water from organic impurities, for example, such adsorbers are filled with activated carbon. At peak consumption times, the available adsorbers are then operated in parallel to prevent the flow rate from rising above the upper limit permitted by the particular arrangement. At times of lower water consumption, individual adsorbers are taken out of operation and can be serviced, for example, whereby the adsorption material is subjected to special loads, as described in greater detail below.

The use of granules, which can be produced by compacting e.g. powdered iron oxide using high linear forces, has also already been considered. Such granules have already been described as a means of homogeneously colouring liquid concrete. The use of high linear forces for compacting is extremely expensive and energy-intensive, and the stability of the compacted materials is inadequate for extended use in adsorbers.

The use of such materials in adsorbers, for example, particularly continuous models, for water purification is therefore of only limited interest. During maintenance or cleaning of adsorber plants by back-flushing in particular (see below), such granules lose large amounts of substance due to the associated agitation. The abraded material renders the waste water from back-flushing extremely turbid. This is unacceptable for a number of reasons: firstly, adsorption material, which is heavily laden with impurities and therefore toxic after extended use, is lost. Secondly, the stream of waste water is laden with abraded material, which can sediment, damaging piping systems and ultimately subjecting the waste treatment plant to undesirable physical and toxicological stresses, to name but a few reasons. Preferably the abrasion should be below 20% by weight, more preferably below 15% by weight, 10% by weight or most preferably below 5% by weight according to the method described in the examples of the present invention.

An object of the present invention was therefore to provide a contact or an adsorbent/catalyst based on iron-oxygen compounds in pellet form, exhibiting high mechanical resistance in conjunction with a good binding capacity for contaminants contained in liquids and gases without the need to use organic binders or inorganic foreign binders to achieve adequate mechanical resistance, and plants operated with such media. This object is achieved by the contacts or adsorbents/catalysts according to the invention, their preparation, their use and the units filled therewith.

SUMMARY OF THE INVENTION

The invention relates to a unit suitable for the through-flow of a fluid medium at least partially filled with particles agglomerated from fine-particle iron oxide and/or iron oxyhydroxide, wherein the fine-particle iron oxide and/or iron oxyhydroxide displays a particle size of up to 500 nm and a BET surface area of 50 to 500 m$^2$/g.

The invention also relates to a process for the production of particles from fine-particle iron oxide and/or iron oxyhydroxide comprising the steps of producing an aqueous suspension of fine-particle iron oxides and/or iron oxyhydroxides having a BET surface area of 50 to 500 m$^2$/g, and removing the water and dissolved constituents by either I) a) first removing only the water from the suspension, b) introducing the residue thus obtained in water, c) filtering the material obtained, d) washing the residue, and e) either e1) completely dehydrating the filter cake obtained as residue and comminuting the material thus obtained to the desired shape and/or size or e2) partially dehydrating the filtercake to obtain a paste, shaping the paste and subsequently additionally drying the paste until a pellet is obtained, or II) a) filtering the suspension, b) washing the residue, c) either c1) completely dehydrating the filter cake obtained as residue in the form of a solid to semisolid paste and then comminuting the material thus obtained to the desired shape and/or size or c2) partially dehydrating the filtercake to obtain a paste, shaping the paste, and subsequently additionally drying the paste until a pellet is obtained.

DETAILED DESCRIPTION OF THE INVENTION

To prepare the granules according to the invention, an aqueous suspension of fine-particle iron oxyhydroxides and/or iron oxides is first produced according to the prior art. The water and constituents dissolved within it can be removed from this in two different ways:

Method 1:

For applications in which lower demands are made of the mechanical strength of the granules/contacts, only the water is removed initially, e.g. by evaporation. A residue is obtained which in addition to the fine-particle iron oxide and/or hydroxide also contains the entire salt content. This residue is redispersed in water after being dried, for which purpose only relatively little shear force needs to be applied. This suspension is then filtered and the residue washed until it is substantially free from salts. The filter cake obtained as residue is a solid to semisolid paste which generally has a water content of between 10 and 90 wt. %.

This can then be completely or partially dehydrated, and the material thus obtained can then be comminuted to the desired shape and/or size. Alternatively the paste or filter cake, optionally after predrying to achieve a sufficiently solid state, can undergo shaping followed by (additional) drying until a pellet state is achieved. The subsequent application of the granules determines the preferred procedure to be followed for their production, which can be determined by the person skilled in the art in the particular field of application by means of simple preliminary orienting experiments. Both the directly dried filter cake and the dried shaped bodies can then be used as contact or adsorbent.

Method 2:

For applications in which higher demands are made of the mechanical strength of the granules/contacts, the suspension is filtered and the residue washed until it is substantially free from salts. The filter cake obtained as residue is a solid to semisolid paste. This can then be completely or partially dehydrated, and the material thus obtained can then be comminuted to the desired shape and/or size. Alternatively the paste or filter cake, optionally after predrying to achieve a sufficiently solid state, can undergo shaping followed by (additional) drying until a pellet state is achieved. The subsequent application of the granules determines the preferred procedure to be followed for their production, which can be determined by the person skilled in the art in the particular field of application by means of simple preliminary orienting experiments. Both the directly dried filter cake and the dried shaped bodies can then be used as contact or adsorbent.

Although the products obtained according to method 1 are less mechanically resistant, filtration can be performed more easily and quickly. The fine-particle pigments isolated in this way can moreover be incorporated very easily into paints and polymers, for example, because considerably less shear force is required than is needed to incorporate the fine-particle pigments obtained according to method 2.

The fine-particle iron oxide and/or iron oxyhydroxide used has a particle size of up to 500 nm, preferably up to 100 nm, particularly preferably 4 to 50 nm, and a BET surface area of 50 to 500 $m^2/g$, preferably 80 to 200 $m^2/g$.

The primary particle size was determined by measurement from scanning electron micrographs, e.g. at a magnification of 60000:1 (instrument:XL30 ESEM FEG, Philips). If the primary particles are needle-shaped, as in the $\alpha$-FeOOH phase for example, the needle width can be given as a measurement for the particle size. Needle widths of up to 100 nm, but mainly between 4 and 50 nm, are observed in the case of nanoparticle $\alpha$-FeOOH particles. $\alpha$-FeOOH primary particles conventionally have a length:width ratio of 5:1 to 50:1, typically of 5:1 to 20:1. The length:width ratio of the needle shapes can be varied, however, by doping or by special reaction processes. If the primary particles are isometric, as in the $\alpha$-$Fe_2O_3$, $\gamma$-$Fe_2O_3$, $Fe_3O_4$ phases for example, the particle diameters can quite easily also be below 20 nm.

By mixing nanoparticle iron oxides or iron (oxy)hydroxides with pigments and/or $Fe(OH)_3$, the presence of the cited pigment or nucleus particles in their known particle morphology, held or glued together by the nanoparticle nucleus particles or the amorphous $Fe(OH)_3$ polymer, can be detected on the scanning electron micrographs.

Products obtainable by methods 1) and 2) can then be comminuted further, for example by rough grinding or grinding. However, since the products reduce in size on first coming into contact with water, for example when a freshly charged adsorber unit is first filled with water, this will generally be unnecessary.

Granulation of a semi-wet paste has proven effective as another method of producing granules. Here pellets or strands are formed from a semi-wet paste, e.g. using a simple perforated metal sheet, a roll press or an extruder, and either dried immediately or additionally shaped into a spherical or granular form by means of a spheroniser. The still wet spherules or granules can subsequently be dried to any moisture content whatsoever. A residual moisture content of <50% is recommended to prevent the granules from agglomerating. A spherical shape of this type can be advantageous for use in fixed-bed adsorbers due to the improved packing in the adsorber vessel that is obtained in comparison with rough-ground granules or pellets in strand form.

The filtration performance of the suspensions can generally be improved by the use of conventional filtration-improving measures, such as are described for example in Solid-Liquid Filtration and Separation Technology, A. Rushton, A. S. Ward, R. G. Holdich, 2nd edition 2000, Wiley-VCH, Weinheim, and in Handbuch der Industriellen Fest/Flüssig-Filtration, H. Gasper, D. Öchsle, E. Pongratz, 2nd edition 2000, Wiley-VCH Weinheim. Coagulants can thus be added to the suspensions, for. example.

Iron carbonates can also be used in addition to or in place of the iron oxyhydroxides.

The products according to the invention can undergo drying in air, and/or in vacuo, and/or in a drying oven and/or on belt dryers or by spray drying, preferably at temperatures from −25 to 250° C., particularly preferably at 60 to 120° C.

The products according to the invention preferably have a residual water content of less than 20 wt. %.

It was found that the pellets or granules obtained in this way have a high binding capacity for contaminants contained in water, liquids or gases and they additionally have an adequately high resistance to flowing media in terms of mechanical or hydraulic stressing.

It is particularly surprising that during drying, fine-particle iron oxyhydroxides or iron oxides having large specific surface areas solidify into very hard agglomerates, which without the addition of binders have a high mechanical abrasion resistance and high hydraulic resistance to contact with flowing water, and which have a high binding capacity for the contaminants and trace constituents contained in the water.

Transparent iron oxyhydroxide pigments, for example, having an average particle size of less than 0.1 μm and specific surface areas of greater than 80 $m^2$, are suitable for the use according to the invention of fine-particle iron oxyhydroxides. Correspondingly fine-particle iron oxide pigments, preferably haematite, magnetite or maghemite, can also be used, however.

The production of yellow fine-particle iron oxyhydroxide pigments (e.g. goethite) in the acid or alkaline pH range, known as acid or alkaline nuclei, is known. The production of other fine-particle iron oxide or iron oxyhydroxide pigments is also known. Such pigments can contain structures based on $\alpha$, $\beta$, $\gamma$, $\delta$, $\delta'$, $\epsilon$ phases and/or $Fe(OH)_2$ and mixed and intermediate phases thereof. Fine-particle yellow iron oxyhydroxides can be calcined to fine-particle red iron oxides.

The production of transparent iron oxides and iron oxyhydroxides is known e.g. according to DE-A 2 603 050 from BIOS 1144, p. 29 to 33 or from FIAT 814, p. 1 to 26.

Fine-particle yellow iron oxyhydroxide pigments are generally synthesized by precipitating iron(II) hydroxides or carbonates from corresponding iron(II) salt solutions such as e.g. $FeSO_4$, $FeCl_2$ in pure form or as pickling solutions in the acid or alkaline pH range, followed by oxidation to iron(III) oxyhydroxides (see inter alia G. Buxbaum, Industrial Inorganic Pigments, VCH Weinheim, 2nd edition, 1998, p. 231ff). Oxidation of the divalent to the trivalent iron is preferably performed with air, whereby intensive aeration is advantageous. Oxidation with $H_2O_2$ also leads to fine-particle iron oxyhydroxides. The temperature chosen for precipitation and oxidation should be as low as possible in order to obtain very fine-particle yellow pigments. It is preferably between 15° C. and 45° C. NaOH is preferably used as alkaline precipitant. Other precipitants, such as KOH, $Na_2CO_3$, $K_2CO_3$, CaO, $Ca(OH)_2$, $CaCO_3$, $NH_3$, $NH_4OH$, MgO and/or $MgCO_3$, can also be used, however.

By choosing suitable precipitation and oxidation conditions, nanoparticle $\alpha$, $\beta$, $\gamma$, $\delta$ phases and mixed phases of iron oxyhydroxides displaying a large specific surface area can be prepared, such that the nanoparticles agglomerate in the dry state and possess a high resistance to mechanical and fluid-mechanical abrasion in comminuted form.

Production of fine-particle iron oxyhydroxides by simultaneous rapid treatment of iron(II) salt solutions with NaOH and air has proven to be particularly beneficial in practice because this production method leads to particularly fine-particle iron (oxy)hydroxides and hence to a greater stability of the finished product in addition to a higher force of adsorption.

To steer the precipitated pigments in the direction of the extremely fine-particle character that is required, the precipitations, e.g. of yellow $\alpha$-FeOOH as described in U.S. Pat. No. 2,558,303 and U.S. Pat. No. 2,558,304, are performed in the alkaline pH range with alkali carbonates as precipitants, and modifiers such as $SiO_2$, zinc, aluminium or magnesium salts, hydroxycarbonic acids, phosphates and metaphosphates are generally added. Products produced in this way are described in U.S. Pat. No. 2,558,302. Such nucleus modifiers do not interfere with the subsequent reprocessing, recycling or any other use of the adsorbents according to the invention. In the case of precipitation processes in an aqueous medium, it is known that precipitations in an alkaline environment lead to less solidly agglomerated powders than those in an acid environment.

One of the advantages of nucleus modifiers, however, is that an adequate fine-particle character can be obtained even at elevated reaction temperatures.

DE-A 4 235 945 reports on the production of fine-particle iron oxides using a precipitation method in the acid pH range and without modifiers.

DE-A 4 434 669 describes a process by which highly transparent yellow, chemically pure iron oxide pigments can be produced by secondary treatment thereof with sodium hydroxide solution.

DE-A 4 434 972 reports on highly transparent, yellow iron oxide pigments in the $\alpha$-FeOOH modification having a specific surface area of over 100 $m^2$/g and high temperature resistance.

DE-A 4 434 973 describes highly transparent yellow iron oxide pigments, which are produced by means of the process steps of nuclear precipitation in the acid pH range, nuclear oxidation, nuclear maturation and pigment formulation.

Red, transparent iron oxide pigments obtained by calcining from yellow, transparent iron oxide pigments are known from DE-A 4 434 668 and DE-A 4 235 946.

By preparing diverse phases of iron oxyhydroxides in pure form or in any mixture from iron(II) salt solutions using the known precipitation and oxidation reactions, separating the resultant iron oxyhydroxides out of the suspension, optionally after a secondary treatment, by filtering the salt solution and washing them until they are largely free from salts, preferably down to a residual conductivity of <5 mS/cm, then drying the solid or semisolid filter cake just as it is or optionally after mechanical shaping until it achieves a solid state, a mechanically highly resistant material displaying a high binding capacity for the contaminants conventionally contained in waste waters or waste gases is obtained.

Drying is conveniently performed at temperatures of up to 250° C. The material can also be vacuum or freeze dried. The particle size of the material can be freely selected but is preferably between 0.2 and 40 mm, particularly preferably between 0.2 and 20 mm. This can be achieved by shaping the semisolid, pasty filter cake mechanically, before drying, in a granulation or pelletising plant or in an extruder to form shaped bodies whose size is in the range between 0.2 and 20 mm, with subsequent drying in the air, on a belt dryer or in a drying oven, and/or by mechanical comminution to the desired particle size after drying.

The products described, the process for their production and their use represent an improvement over the prior art. In contrast to those based on coarse-particle iron oxyhydroxides and/or oxides, the granules according to the invention based on fine-particle iron oxyhydroxides and/or oxides can be subjected to much higher stresses and therefore display a much greater abrasion resistance to mechanical and hydraulic stressing. They can be used directly as such. When used in adsorber plants for water purification, for example, there is no need even for comminution or rough grinding of the crude dry substance initially obtained from filter cakes or extruders, since the coarse pellets break down independently on contact with water. This results in a random particle-size distribution, but no particles of such a size that they are discharged from the adsorber to any significant extent by the flowing medium.

There is absolutely no need for a separate granulation process, such as would be necessary when using conventional iron oxyhydroxides in the form of (flowable) powders, either with the aid of foreign binders or using extremely high linear forces during compacting.

According to the invention, the suspensions of fine-particle iron oxyhydroxides or iron oxides can also be supplemented with conventional powdered iron oxyhydroxides or iron oxides. The quantities in each case are determined by the properties of these powdered iron oxyhydroxides or iron oxides and by the requirements of the product according to the invention in terms of its mechanical stability and abrasion resistance. Although the addition of powdered pigments will generally reduce the mechanical strength of the products according to the invention, filtration of the fine-particle suspensions is made easier. The person skilled in the art and practising in the particular field of application will be able to determine the optimum mixing ratio for the intended application by means of a few orienting experiments.

The nanoparticle nuclei are conveniently produced in an excess of sodium hydroxide solution.

A quantity of $Fe_2(SO_4)_3$ corresponding to the NaOH excess can also be added to the suspensions of the alkaline fine-particle nuclei. This measure considerably improves the filterability of the suspension. The initially amorphous $Fe(OH)_3$ produced matures over time, to the $\alpha$-FeOOH phase, for example. This ensures that the sodium hydroxide solution used in excess to produce the alkaline nucleus is completely used up. The material thus obtained also displays large specific surface areas. Just like the iron oxyhydroxides described above, the material is extremely suitable for use in adsorbers since it possesses a high resistance to mechanical loading in addition to a high adsorption capacity.

The granules according to the invention are particularly preferably used in the cleaning of liquids, especially for the removal of heavy metals. A preferred application in this industrial field is the decontamination of water, particularly of drinking water. Particular attention has recently been paid to the removal of arsenic from drinking water. The granules according to the invention are extremely suitable for this purpose, since levels that not only meet but actually fall below even the lowest limiting values set by the US authority the EPA can be achieved using the granules according to the invention.

To this end the granules can be used in conventional adsorber units, such as are already used with a charge of activated carbon, for example, to remove other types of contaminants. Batchwise operation, in cisterns or similar containers for example, optionally fitted with agitators, is also possible. However, use in continuous plants such as continuous-flow adsorbers is preferred.

Since untreated water to be processed into drinking water conventionally also contains organic impurities such as algae and similar organisms, the surface of adsorbents, especially the outer surface of granular adsorbents, becomes coated during use with mostly slimy deposits, which impede or even prevent the inflow of water and hence the adsorption of constituents to be removed. For this reason adsorber units are periodically back-flushed with water, a process which is preferably performed at times of low water consumption (see above) on individual units that have been taken out of service. The adsorbent is whirled up and the associated mechanical stress to which the surface is subjected causes the undesirable coating to be removed and discharged against the direction of flow during active operation. The wash water is conventionally sent to a sewage treatment plant. The adsorbents according to the invention have proven to be particularly effective in this process, since their high strength enables them to be cleaned quickly without suffering any significant losses of adsorption material and without the back-flush water sent for waste treatment being rich in discharged adsorption material, which is possibly already highly contaminated with heavy metals.

Since the granules according to the invention are free from foreign binders, the material is comparatively easy to dispose of after use. For instance, the adsorbed arsenic can be removed by thermal or chemical means in special units, for example, resulting in an iron oxide pigment as a pure substance which can either be recycled for use in the same application or supplied for conventional pigment applications. Depending on the application and legal regulations, the content of the adsorber can also be used without prior removal of the heavy metals, for example as a pigment for colouring durable construction materials such as concrete, since the heavy metals removed from the drinking water are permanently immobilised in this way and taken out of the hydrological cycle.

The invention therefore also provides water treatment plants or waterworks in which units filled with the granules according to the invention are operated, and processes for the decontamination of water by means of such units, as well as such units themselves.

For many applications, particularly those in which a maximum mechanical strength is not required of the granules, the addition of powdered pigments during production of the granules according to the invention is a preferred embodiment.

Thus, for example, up to 40 wt. % of commercial goethite (Bayferrox 920, Bayer AG, Leverkusen DE) can be added to a nucleus suspension according to example 2 of the present application if the granules obtained according to the invention are to be used for the removal of arsenic from drinking water in adsorbers with a through-flow of water.

The BET specific surface area of the products according to the invention is determined by the carrier gas process (He: $N_2$=90:10) using the single-point method, according to DIN 66131 (1993). The sample is baked for 1 h at 140° C. in a stream of dry nitrogen before measurement.

In order to measure the adsorption of arsenic(III) and arsenic(V), 3 liters of an aqueous solution of $NaAsO_2$ or $Na_2HAsO_4$, each with the specified concentration of approx. 2-3 mg/l arsenic, are treated with 3 g of the sample to be tested in a 5 liter PE flask for a specific period and the flask moved on rotating rollers. The adsorption rate of As ions on iron hydroxide over this specific period, e.g. one hour, is stated as $mg(As^{3+/5+})/g(FeOOH) \cdot h$, calculated from the balance of the $As^{3+/5+}$ ions remaining in solution.

The adsorption of $Sb^{3+}$, $Sb^{5+}$, $Hg^{2+}$, $Pb^{2+}$, $Cr^{6+}$ or $Cd^{2+}$ ions is measured in the same way, whereby the desired concentrations are established by dissolving appropriate amounts of $Sb_2O_3$, $KSb(OH)_6$, $PbCl_2$, $NaCrO_4$ or $CdCl_2$ in $H_2O$ and adjusting the pH value to 7-9.

The As, Sb, Cd, Cr, Hg or Pb contents of the contaminated iron oxyhydroxide or of the solutions are determined using mass spectrometry (ICP-MS) according to DIN 38406-29 (1999) or by optical emission spectroscopy (ICP-OES) according to EN-ISO 11885 (1998), with inductively coupled plasma as excitation agent in each case.

The mechanical and hydraulic abrasion resistance was assessed using the following method: 150 ml of demineralised water were added to 10 g of the granules to be tested, having particle sizes >0.1 mm, in a 500 ml Erlenmeyer flask, which was rotated on a LabShaker shaking machine (Kühner model from Braun) for a period of 30 minutes at 250 rpm. The >0.1 mm fraction was then isolated from the suspension using a screen, dried and weighed. The weight ratio between the amount weighed out and the amount weighed in determines the abrasion value in %.

The invention is described in greater detail in the following by means of examples. The examples are intended to illustrate the process and do not constitute a limitation.

EXAMPLES

Example 1

237 l of an aqueous iron sulfate solution with a concentration of 150 g/l $FeSO_4$ were prepared at 24° C. 113 l of an aqueous NaOH solution (227 g/l) were then quickly added and the light blue suspension then oxidised with 40 l of air per hour and per mol of iron for 1.5 hours.

The yellow suspension thus obtained was filtered out through a filter press and the solid washed until the residual filtrate conductivity was 1 mS/cm. The filter cake was in the form of a spreadable and kneadable paste, which was dried on metal sheets in a circulating air drying oven at 75° C. until the residual moisture content was 3 wt. %. The dried material was then roughly ground to produce particle sizes of between 0.5 and 2 mm. The hard pellets thus obtained were then placed directly in an adsorber tank.

The product consisted of 100% α-FeOOH with an extremely short-needled habit, whereby the needles were congregated to form solid macroscopic agglomerates. Using a scanning electron micrograph e.g. at a magnification of 60000:1, the needle widths were measured at between 15 and 35 nm, the needle lengths between 150 and 350 nm. The needles were extremely agglomerated.

The BET specific surface area was 122 m$^2$/g. The adsorption rate for NaAsO$_2$ with an original concentration of 2.3 mg (As$^{3+}$)/l was 2.14 mg(As$^{3+}$)/g(FeOOH)·h, for Na$_2$HAsO$_4$ with an original concentration of 2.7 mg (As$^{5+}$)/l it was 2.29 mg(As$^{5+}$)/g(FeOOH)·h.

Example 2

800 l of an aqueous iron sulfate solution with a concentration of 150 g/l FeSO$_4$ were prepared at 29° C. and 147 l of an aqueous NaOH solution (300 g/l) added over 20 minutes with stirring. 2.16 kg of a nucleus modifier in the form of a 57% aqueous glycolic acid solution were then added to the grey-blue suspension formed in order to reduce the particle size of the nuclei, and oxidation was performed for 7 hours with 38 l of air per hour and per mol of iron.

The dark brown suspension was filtered out through a filter press and the solid washed until the residual filtrate conductivity was 1 mS/cm. The filter cake was dried at 70° C. in a circulating air drying oven to a residual moisture of 5%, and the very hard blackish brown dry product was roughly ground in a roller crusher to particle sizes of up to 2 mm. The fine fraction <0.2 mm was separated out using a screen.

An X-ray diffractogram showed that the product consisted of 100% α-FeOOH. Using a scanning electron micrograph e.g. at a magnification of 60000:1, the needle widths were measured at between 15 and 20 nm, the needle lengths between 50 and 80 nm. The particles were extremely agglomerated. The BET specific surface area was 202 m$^2$/g. The granules thus obtained were placed directly in an adsorber tank with no further treatment.

The granules displayed an excellent adsorption performance in respect of the contaminants contained in the flowing water and demonstrated a high abrasion resistance, particularly when the adsorber tank is being back-flushed causing the granules to be whirled up strongly. The abrasion value after 30 minutes was only 1%.

Adsorption performance: The adsorption rate for NaAsO$_2$ with an original concentration of 2.4 mg (As$^{3+}$)/l was 1.0 mg(As$^{3+}$)/g(FeOOH)·h, for Na$_2$HAsO$_4$ with an original concentration of 2.8 mg (As$^{5+}$)/l it was 2.07 mg(As$^{3+}$)/g(FeOOH)·h.

Example 3

1.3 l of an aqueous 300 g/l NaOH solution were added to an α-FeOOH suspension obtained according to example 2 after a two-hour maturation at 30° C. with stirring, and post-oxidation was performed simultaneously for one hour with 190 l of air. The product was processed as described in example 2. Fine-particle needles of pure α-FeOOH with a BET specific surface area of 130 m$^2$/g were obtained. Using a scanning electron micrograph e.g. at a magnification of 60000:1, the needle widths were measured at between 15 and 20 nm, the needle lengths between 50 and 90 nm. The needles were extremely agglomerated. The granules proved to be very mechanically and hydraulically resistant, and the abrasion value was only 3.9%.

Adsorption performance: The adsorption rate for NaAsO$_2$ with an original concentration of 2.3 mg/l was 1.1 mg(As$^{3+}$)/g(FeOOH)·h, for Na$_2$HAsO$_4$ with an original concentration of 2.8 mg/l it was 1.7 mg(As$^{3+}$)/g(FeOOH)·h.

Example 4

306 l of an aqueous NaOH solution (45 g/l) were prepared at 31° C. and 43 l of an aqueous solution of FeCl$_2$ (344 g/l) quickly added with stirring, and oxidation was then performed with 60 l of air per hour and per mol Fe. The dark yellow suspension thus obtained was processed in the same way as in example 1.

An X-ray diffractogram showed that the product consisted of 100% α-FeOOH. Using a scanning electron micrograph e.g. at a magnification of 60000:1, the needle widths were measured at between 15 and 50 nm, the needle lengths between 100 and 200 nm. The needles were extremely agglomerated. The BET specific surface area was 132 m$^2$/g.

The granules thus obtained were placed in an adsorber tank with no further treatment. The granules displayed an excellent adsorption performance in respect of the contaminants contained in the water and demonstrated a high abrasion resistance, particularly when the adsorber tank is being back-flushed causing the granules to be whirled up strongly. The abrasion value after 30 minutes was only 12 wt. %.

Adsorption performance: The adsorption rate for NaAsO$_2$ with an original concentration of 2.4 mg (As$^{3+}$)/l was 2.11 mg(As$^{3+}$)/g(FeOOH)·h, for Na$_2$HAsO$_4$ with an original concentration of 2.7 mg (As$^{5+}$)/l it was 2.03 mg(As$^{5+}$)/g(FeOOH)·h.

Example 5

124 l of an aqueous NaOH solution (114 g/l) were prepared at 24° C. and 171 l of an aqueous solution of FeSO$_4$ (100 g/l) quickly added with stirring, and oxidation was then performed with 10 l air per hour and per mol Fe. Immediately upon completion of oxidation, 56 l of an aqueous solution of Fe$_2$(SO$_4$)$_3$ (100 g/l) were added and stirred for 30 minutes. The yellowish brown suspension thus obtained was processed in the same way as in example 1.

An X-ray diffractogram showed that the product consisted of 100% α-FeOOH. Using a scanning electron micrograph e.g. at a magnification of 60000:1, the needle widths were measured at between 15 and 35 nm, the needle lengths between 70 and 180 nm. The needles were extremely agglomerated. The BET specific surface area was 131 m$^2$/g. The abrasion value after 30 minutes was only 7 wt. %.

Adsorption performance: The adsorption rate for NaAsO$_2$ with an original concentration of 2.3 mg (As$^{3+}$)/l was 1.7 mg(As$^{3+}$)/g(FeOOH)·h, for Na$_2$HAsO$_4$ with an original concentration of 2.7 mg (As$^{5+}$)/l it was 1.2 mg(As$^{5+}$)/g(FeOOH)·h.

Example 6

7905 kg FeSO$_4$ were prepared, dissolved with water to a volume of 53.3 m$^3$, the solution cooled to 14° C. and 1000 kg MgSO$_4$·7 H$_2$O added to this solution. The prepared solution was then diluted at 14° C. with 5056 kg NaOH as a solution with approx. 300 g/l and then oxidised with 4000 m$^3$/h air to a precipitation degree of >99.5%. The batch was washed on a filter press until the residual filtrate conductivity was <1000 μS/cm and the paste pushed through a perforated metal sheet with hole diameters of 7 mm, causing it to be formed into strands. The strands were dried on a belt dryer to a residual moisture of approx. 3%. An X-ray diffractogram showed that the product consisted of 100% α-FeOOH with very short needles. Using a scanning electron micrograph e.g. at a magnification of 60000:1, the needle widths were measured at between 30 and 50 nm. The needle lengths could not be clearly determined as the needles were too greatly agglomerated. The BET specific surface area was 145 m$^2$/g. The abrasion value after 30 minutes was only 6%.

Adsorption performance: The adsorption rate for NaAsO$_2$ with an original concentration of 2.5 mg (As$^{3+}$)/l was 1.8 mg(As$^{3+}$)/g(FeOOH)·h, for Na$_2$HAsO$_4$ with an original concentration of 2.9 mg (As$^{5+}$)/l it was 1.5 mg(As$^{5+}$)/g(FeOOH)·h.

Example 7

4096 kg NaOH (as solution with approx. 300 g/l) were prepared and diluted with water to 40 m$^3$. 4950 kg FeSO$_4$ were dissolved with water to form 48.5 m$^3$ solution, cooled to 15° C. and then pumped into the prepared NaOH over 1 h. The suspension was then oxidised with 1500 m$^3$/h air over approx. 2 h. Approx. 2 m$^3$ of the nucleus suspension was washed on a filter press to obtain a filtrate conductivity <1000 μS/cm, the filter cake was dried in a drying oven at 75° C. and the dried material roughly ground to particle sizes <1.5 mm. The fine fraction <0.5 mm was separated out using a screen. The material thus obtained had a BET specific surface area of 153 m$^2$/g and consisted of 100% α-FeOOH. Using a scanning electron micrograph e.g. at a magnification of 60000:1, the needle widths were measured at between 15 and 35 nm, the needle lengths between 50 and 100 nm. The needles were extremely agglomerated.

Adsorption performance: The adsorption rate for NaAsO$_2$ with an original concentration of 2.7 mg (As$^{3+}$)/l was 1.7 mg(As$^{3+}$)/g(FeOOH)·h, for Na$_2$HAsO$_4$ with an original concentration of 2.8 mg (As$^{5+}$)/l it was 1.4 mg(As$^{5+}$)/g(FeOOH)·h.

Example 8

3100 kg NaOH (as solution with approx. 100 g/l) were measured out and diluted with cold water to 31 m$^3$. The temperature of the solution was 26° C. 3800 kg FeSO$_4$ were dissolved with water to form about 38 m$^3$ solution, cooled to 13-14° C. and then pumped with stirring into the prepared NaOH. The suspension was then oxidised with 2500 m$^3$/h air in approx. 75 min. 18.2 m$^3$ FeSO$_4$ solution (100 g/l) were added at a rate of 150 l/min to this suspension with stirring and gassing. The suspension was filtered on a filter press and washed until the residual filtrate conductivity was <1000 μS/cm, the paste was pushed through a perforated metal plate and were dried on a belt dryer to a residual moisture of less than 20%. The dry pellets were roughly ground to obtain a particle size of less than 2 mm. The portion of the particles with less then 0.5 mm was removed. The material thus obtained had a BET specific surface area of 145 m$^2$/g and consisted of 100% α-FeOOH.

Example 9

An aqueous solution of FeSO$_4$ (100 g/l) was added at room temperature to 1600 g of the alkaline nucleus suspension prepared according to example 7 (2.7% FeOOH) with stirring and simultaneous aeration with 130 l/h of air until a pH of 8 was obtained. The nucleus suspension obtained was filtered, washed and the filter cake dried at 75° C. and roughly ground to particle sizes of between 0.5 and 2 mm as described in example 7. The material thus obtained had a BET specific surface area of 163 m$^2$/g and according to the X-ray diffractogram consisted of 100% α-FeOOH. The scanning electron micrograph, e.g. at a magnification of 60000:1, showed that the needles are extremely agglomerated. Adsorption performance: The adsorption rate for NaAsO$_2$ with an original concentration of 2.7 mg (As$^{3+}$)/l was 2.0 mg(As$^{3+}$)/g (FeOOH)·h, for Na$_2$HAsO$_4$ with an original concentration of 2.7 mg (As$^{5+}$)/l it was 1.9 mg(As$^{5+}$)/g(FeOOH)·h, for KSb(OH)$_6$ (original concentration 3.0 mg (Sb$^{5+}$)/l) the adsorption was 2.5 mg (Sb$^{5+}$)/g (FeOOH)·h, for Na$_2$CrO$_4$ (original concentration 47 μg (Cr$^{6+}$)/l) 42 μg (Cr$^{6+}$)/g(FeOOH)·h were adsorbed, for PbCl$_2$ (original concentration 0.94 mg (Pb$^{2+}$)/l) 0.46 mg (Pb$^{2+}$)/g(FeOOH)·h were adsorbed.

Example 10

6.4 l of an aqueous solution of NaOH (100 gA) were prepared at 29° C. with stirring and 12.2 l of an aqueous iron(II) sulfate solution (100 g/l) were added with simultaneous introduction of air until a pH of 9 was obtained. The suspension thus obtained was processed in the same way as in example 1. The material had a BET specific surface area of 251 m$^2$/g and according to the X-ray diffractogram consisted of 100% α-FeOOH. The scanning electron micrograph shows short, stumpy needles, which are extremely agglomerated. Abrasion performance: 5%.

Adsorption performance: The adsorption rate for NaAsO$_2$ with an original concentration of 2.7 mg (As$^{3+}$)/l was 1.1 mg(As$^{3+}$)/g(FeOOH)·h, for Na$_2$HAsO$_4$ with an original concentration of 2.7 mg (As$^{5+}$)/l it was 1.0 mg(As$^{5+}$)/g(FeOOH)·h.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Granules comprising agglomerates of fine-particle iron oxyhydroxide in the α-FeOOH phase having a BET surface area of 50 to 500 m$^2$/g and mechanical and hydraulic abrasion resistance of <12%.

2. The granules according to claim 1, wherein the BET surface area is 80 to 200 m$^2$/g.

3. The granules according to claim 1, wherein the granules have a residual moisture of <50%.

4. The granules according to claim 1, wherein the granules have an arsenic (V) adsorption of >37%.

5. The granules according to claim 1, wherein the granules have an arsenic (III) adsorption of >40.7%.

6. The granules according to claim 1, wherein the granules have a size of from 0.2 to 2 mm.

* * * * *